(12) United States Patent
Fillatreau et al.

(10) Patent No.: US 7,225,551 B2
(45) Date of Patent: Jun. 5, 2007

(54) ELECTRONIC COMPASS AND METHOD FOR TRACKING VEHICLE ROTATION

(75) Inventors: Philippe Fillatreau, Toulouse (FR); Francois-Xavier Bernard, Corronsac (FR)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 14 days.

(21) Appl. No.: 11/101,281

(22) Filed: Apr. 7, 2005

(65) Prior Publication Data

US 2005/0223574 A1 Oct. 13, 2005

Related U.S. Application Data

(60) Provisional application No. 60/560,207, filed on Apr. 7, 2004.

(51) Int. Cl.
*G01C 17/38* (2006.01)
(52) U.S. Cl. .......................... 33/356; 702/92
(58) Field of Classification Search .............. 33/356, 33/357, 355 R; 73/1.76; 701/224; 702/92, 702/93
See application file for complete search history.

(56) References Cited

U.S. PATENT DOCUMENTS

| | | | |
|---|---|---|---|
| 4,611,293 A | | 9/1986 | Hatch |
| 4,807,462 A | * | 2/1989 | Al-Attar ...................... 73/1.76 |
| 4,852,012 A | * | 7/1989 | Suyama ....................... 701/207 |
| 4,862,398 A | * | 8/1989 | Shimizu et al. ............... 702/93 |
| 5,046,031 A | | 9/1991 | Wanous |
| 5,297,063 A | * | 3/1994 | Cage ........................... 702/92 |
| 5,349,529 A | * | 9/1994 | Masumoto et al. ........... 702/85 |
| 5,581,899 A | * | 12/1996 | Brehler et al. ................. 33/356 |
| 6,014,610 A | | 1/2000 | Judge et al. |
| 6,441,823 B1 | * | 8/2002 | Ananya ........................ 345/442 |

FOREIGN PATENT DOCUMENTS

WO    WO 8805155 A1 * 7/1988
WO    WO 9306434 A1 * 4/1993

* cited by examiner

*Primary Examiner*—R. Alexander Smith

(57) ABSTRACT

An example method for controlling an electronic compass includes determining compass tracking angles in a coordinate system for magnetic field data points that correspond to magnetic field sensor signals produced as a vehicle rotates relative to a surrounding magnetic field. The magnetic field data points produce an expected curve in the coordinate system. The rotation of the vehicle is tracked relative to the surrounding magnetic field based upon the compass tracking angles and whether the vehicle has rotated a desired amount is determined based at least partially upon the expected curve and the compass tracking angles.

20 Claims, 3 Drawing Sheets

ELECTRONIC COMPASS AND METHOD FOR TRACKING VEHICLE ROTATION

The application claims priority to U.S. Provisional Application No. 60/560,207, filed on Apr. 7, 2004.

This invention relates to a compass and, more particularly, to an electronic compass assembly and methods for controlling an electronic compass assembly.

BACKGROUND OF THE INVENTION

Electronic compass assemblies are often used in vehicles to indicate to a driver or passenger of the vehicle a direction that the vehicle is facing or traveling. A typical electronic compass assembly includes magnetic sensors that detect a magnetic field of the Earth along a first axis and a second, orthogonal axis. A microprocessor represents the magnetic field detected along the first axis and the second, orthogonal axis as a magnetic field data point having X and Y coordinates and plotted on a reference coordinate system, where a positive Y-axis direction represents magnetic north. A line between the magnetic field data point and the center of the reference coordinate system forms an angle with the positive Y-axis. The microprocessor determines the direction that the vehicle is facing or traveling based upon the angle. The direction is displayed to an occupant of the vehicle as one of North, South, East, West, Northeast, Northwest, Southeast, and Southwest.

The magnetic conditions of the vehicle and surrounding environment of the vehicle typically change over time. As a result, the magnetic sensors are periodically calibrated to correct the magnetic field data for these magnetic changes. Calibration typically includes collecting magnetic field data from the magnetic sensors through a 360° turn of the vehicle (or a predetermined percentage of a 360° turn). The collected magnetic field data is generally in ellipse-shaped pattern. The microprocessor utilizes a statistical fitting procedure to produce a curve that corresponds to the magnetic field data pattern, an elliptical curve for example. The curve is then mathematically adapted to and centered in a reference system. A reference system where the elliptical curve is transformed into a centered circle is typically used. The reference curve provides a reference correction factor for mathematically adapting, or correcting, magnetic field data points. An angle corresponding to a corrected magnetic field data point therefore takes into account the changed magnetic conditions and provides the basis for determining a more accurate vehicle direction.

The microprocessor continually tracks incoming magnetic field data to identify when the vehicle makes another 360° turn. When another 360° turn is identified, the microprocessor uses the data collected during the 360° turn to compute a new reference correction factor. If the new reference correction factor passes a validity check, it replaces the previous reference correction factor and is then used by the microprocessor to correct magnetic field data points for vehicle heading computation.

One typical method for identifying a 360° turn is commonly referred to as bin tracking. Bin tracking includes estimating a tracking angle from a magnetic field data point without first correcting the magnetic field data point for changed surrounding magnetic conditions using the reference correction factor (e.g., an ellipse). The tracking angle may not be useful for determining an accurate vehicle direction, however, it is useful to determine when the vehicle completes a 360° turn.

The microprocessor separates the 360° turn into "bins." Typically, each bin represents a 12° increment of the 360°. Bin #1 might include the increment 1–12°, bin #2 13–24° and so on up to 360°. The microprocessor catalogues the tracking angles in the bins. When all of the bins (or a selected number of the bins) have a cataloged angle, the microprocessor knows that the vehicle has completed a 360° turn (or selected percentage of the 360° turn).

One typical method of estimating a series of tracking angles without first correcting the magnetic field data points includes plotting an uncorrected magnetic field data point on a reference coordinate system (e.g., a coordinate system of the magnetic sensors). For an initial uncorrected magnetic field data point, an offset point lying on a line between the uncorrected magnetic field data point and the center of the reference coordinate system and at a given distance from the uncorrected magnetic field data point is also plotted. The angle between the line and a north reference line that extends from the offset point parallel to the Y-axis is used as the tracking angle for the uncorrected magnetic field data point.

A subsequent tracking angle is determined the same way by plotting a subsequent uncorrected magnetic field data point on the reference coordinate system. If the magnetic field data point lies within a threshold (the given distance plus or minus a percent of the given distance) of the initial offset point, the initial offset point is still used to compute the tracking angle corresponding to the subsequent uncorrected magnetic field data point. If the subsequent uncorrected magnetic field data point lies outside the threshold of the initial offset point, a second offset point is determined. The second offset point lies on a line between the subsequent uncorrected magnetic field data point and the previous offset point. The angle between the line and a north reference line that extends from the second offset point parallel to the Y-axis is the subsequent tracking angle. Thus, for each new incoming uncorrected magnetic field data point, a new corresponding tracking angle is computed, based on the formerly determined offset point or a new one depending on the fact that the new incoming uncorrected magnetic field data point lies within or without the threshold of the last computed (current) offset point.

Disadvantageously, this typical method allows magnetic field data to be collected that is unsuitable for the statistical fitting procedure. When the vehicle has completed a 360° turn (or selected percentage of the 360° turn), the generally ellipse-shaped pattern of the collected magnetic field data is often unsuitable if the elliptical pattern is too flat (i.e., the ratio of the minor axis to the major axis of the elliptical pattern is relatively small for example). In extreme conditions, the generally ellipse-shaped pattern resembles a line rather than an elliptical shape. As a result, the statistical fitting procedure is unable to accurately or reliably calculate an elliptical curve from the line-shaped magnetic field data pattern, which in turn can result in an erroneous calibration.

Accordingly, there is a need for an electronic compass assembly and method that more reliably tracks vehicle rotation in order to identify suitable magnetic field data when the vehicle rotates a desired amount. This invention addresses those needs and provides enhanced capabilities while avoiding the shortcomings and drawbacks of the prior art.

SUMMARY OF THE INVENTION

An example method for controlling an electronic compass includes determining compass tracking angles in a coordinate system for magnetic field data points that correspond to magnetic field sensor signals produced as a vehicle rotates relative to a surrounding magnetic field. The magnetic field data points produce an expected curve in the coordinate system. The rotation of the vehicle is tracked relative to the surrounding magnetic field based upon the compass tracking angles and whether the vehicle has rotated a desired amount is determined based at least partially upon the expected curve and the compass tracking angles.

In another example, a method of controlling an electronic compass assembly includes establishing a vector based upon a first magnetic field data point and a second magnetic field data point that are each in a coordinate system and determining a compass tracking angle that corresponds to one of the first magnetic field data point or the second magnetic field data point based upon a relationship to the vector.

An example electronic compass assembly includes a processor module for controlling an electronic compass assembly. The processor module is operable to determine whether a vehicle has rotated a desired amount of vehicle rotation based at least partially upon compass tracking angles collected through rotation of the vehicle. The processor module is configured to receive a first magnetic field data point and a second magnetic field data point for determining one of the compass tracking angles and calculate a displacement line that extends between them. The processor module calculates a first reference line having a predetermined angular relationship to the displacement line and intersecting the second magnetic field data point, establishes a second reference line having a predetermined direction and intersecting the first reference line, and calculates an angle between the first reference line and the second reference line. The angle is one of the compass tracking angles.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
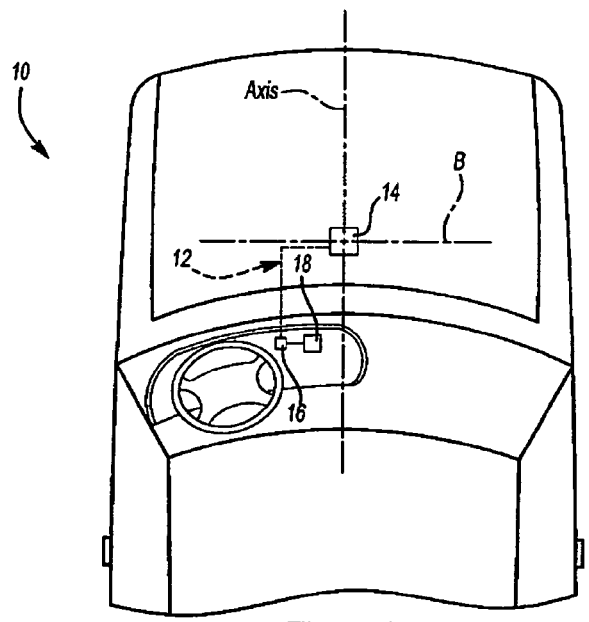
FIG. 1 is a schematic view of selected portions of an example vehicle having an electronic compass assembly.

FIG. 1 is a schematic view of an example vehicle 10 having an electronic compass assembly 12 for determining a direction the vehicle 10 is facing or traveling. In the example shown, the electronic compass assembly 12 includes magnetic sensors 14 that detect a magnetic field along a first longitudinal axis (Axis) and a second, transverse axis B. The magnetic sensors 14 communicate output signals that correspond to magnetic field data to a processor module 16 in a known manner. The processor module displays a vehicle direction based upon the magnetic field data on a display portion 18 to an occupant of the vehicle 10, for example.

As is known, the processor module 16 periodically calibrates the magnetic field sensors 14 to account for magnetic changes to the environment surrounding the vehicle 10. The processor module 16 attempts to perform a calibration of the magnetic sensors 14 when the vehicle rotates a desired amount, such as through a 360° turn for example. In order to identify when the vehicle 10 has rotated the desired amount, the processor module 16 tracks the vehicle 10 rotation using the magnetic field data. When the processor module 16 identifies that the vehicle 10 has completed the desired amount of rotation, the processor module 16 attempts the calibration.

In one example, the processor module 16 determines compass tracking angles based upon magnetic field data points collected through rotation of the vehicle 10. As known, the processor module 16 stores each compass tracking angle within one of a plurality of angular ranges (e.g., bins) that each correspond to an increment of the desired amount of vehicle rotation. The processor module 16 determines that the vehicle has rotated the desired amount when each of the angular ranges includes a stored compass tracking angle.

Figure 2:
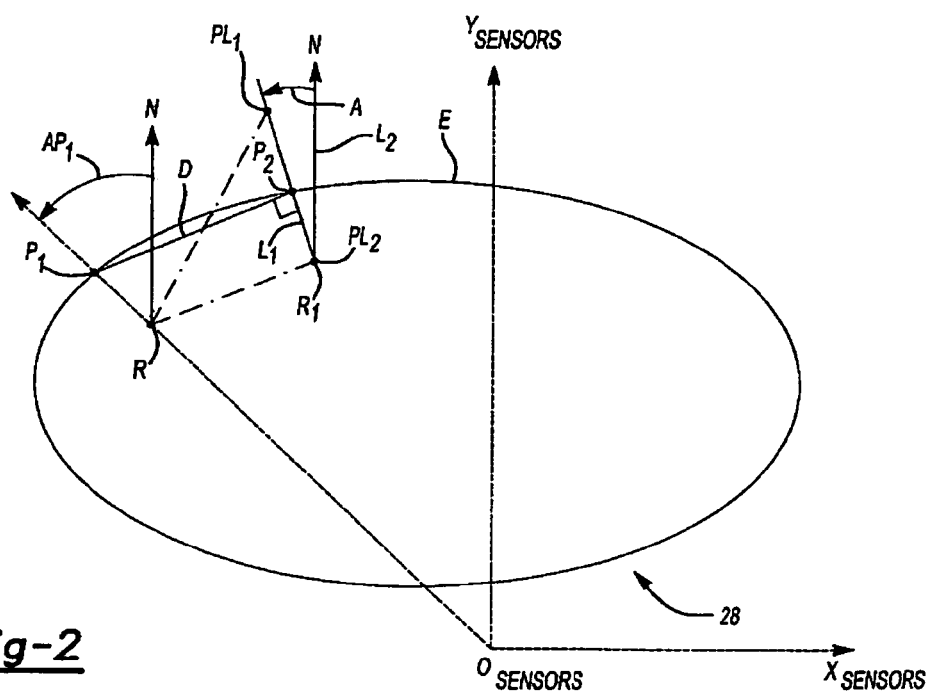
FIG. 2 is an example method used by the processor module to determine a compass tracking angle based upon magnetic field data.

FIG. 2 schematically illustrates an example method used by the processor module 16 to determine a compass tracking angle based upon the collected magnetic field data. The collected magnetic field data are expected to form an elliptical pattern, here represented by an expected elliptical pattern E, when the vehicle 10 rotates through a 360° turn. The processor module 16 then uses the collected magnetic field data to calibrate the magnetic sensors. However, some expected elliptical patterns of the collected magnetic field data indicate that the magnetic field data is unsuitable for calibration. This method provides the benefit of distinguishing suitable from unsuitable expected elliptical patterns, as will be described below.

In the illustrated example, a first magnetic field data point $P_1$ and a second magnetic field data point $P_2$ are represented on a coordinate system 28. These magnetic field data points are expected to form a generally elliptical pattern when the vehicle rotates the desired amount. The expected elliptical pattern is represented in FIG. 2 as an expected elliptical curve E. The expected elliptical curve E is not necessarily calculated, but it is shown here to illustrate the expected shape of the magnetic field data as the vehicle rotates the desired amount. In this example, the coordinate system 28 is a coordinate system of the magnetic field sensors 14.

In the illustrated example, the tracking process begins with an initial point collected by the processor module 16, here the first magnetic field data point $P_1$. An initial compass tracking angle is determined by locating a point of reference R from which to calculate the initial compass tracking angle. The point of reference R is located a predetermined distance from the magnetic field data point $P_1$ towards the center of the coordinate system 28. An initial angle $AP_1$ is determined based upon the point of reference R. In the disclosed examples, the angles are relative to the Y axis, which is represented by line N in the figures. This method of determining the initial angle is generally known. A compass tracking angle is determined the same way using R as a reference point for each subsequent magnetic field data point that lies within a threshold (e.g., the predetermined distance plus or minus a percent of the predetermined distance) of the first point of reference R.

If a subsequent magnetic field data point lies a distance greater than the threshold from the point of reference R, a new reference point $R_1$ is determined to compute subsequent compass tracking angles. In the illustrated example, the second magnetic field data point $P_2$ lies a distance greater than the threshold from the point of reference R.

To determine a compass tracking angle for the second magnetic field data point $P_2$, the processor module determines a displacement line D that extends from $P_1$ to $P_2$. The processor module then determines a first reference line $L_1$. The first reference line $L_1$ intersects the second magnetic field data point $P_2$ and has a predetermined angular relationship to displacement line D. In the illustrated example, the first reference line $L_1$ forms a 90° angle to displacement line D. The processor module 16 then determines the location of a point of reference $R_1$ along the first reference line $L_1$ that is the predetermined distance from the second magnetic field data point $P_2$. In the illustrated example, there are two possible locations, one at $PL_1$ and another at $PL_2$ (i.e., both $R_1$ and $R_2$ are on the first reference line $L_1$ and are the predetermined distance from $P_2$). The processor module 16 compares the distance of each possible location $PL_1$ and $PL_2$ to the point of reference R of the first magnetic field data point $P_1$ and selects the location that is closest to the point of reference R ($PL_2$ in the illustrated example).

The processor module 16 establishes a second reference line $L_2$. The second reference line $L_2$ is represented as being parallel to the Y-axis of the coordinate system 28, and intersects the first reference line $L_1$ at the selected point of reference $R_1$. The processor module 16 then determines an angle A between the second reference line $L_2$ and the first reference line $L_1$. The angle A represents the compass tracking angle corresponding to the second magnetic field data point $P_2$.

In the illustrated example, comparing the distance of the two possible locations, $PL_1$ and $PL_2$, to the point of reference R and selecting the location that is closest to R provides the benefit of locating the point of reference $R_1$ on the same side of the displacement line D as the point of reference R. In one example, this method of calculating the compass tracking angles is advantageous because it prevents the processor module 16 from attempting to perform a calibration when the expected elliptical curve E is undesirable (e.g., when the minor axis of the expected elliptical curve E is too small to provide a reliable calibration result). The illustrated method also provides a consistent way of calculating compass tracking angles. That is, in previous methods the points of reference could flip between being inside an expected ellipse and outside an expected ellipse, which may lead to inconsistent compass tracking. In the disclosed method, the points of reference remain on one side of the expected ellipse.

Figure 3:
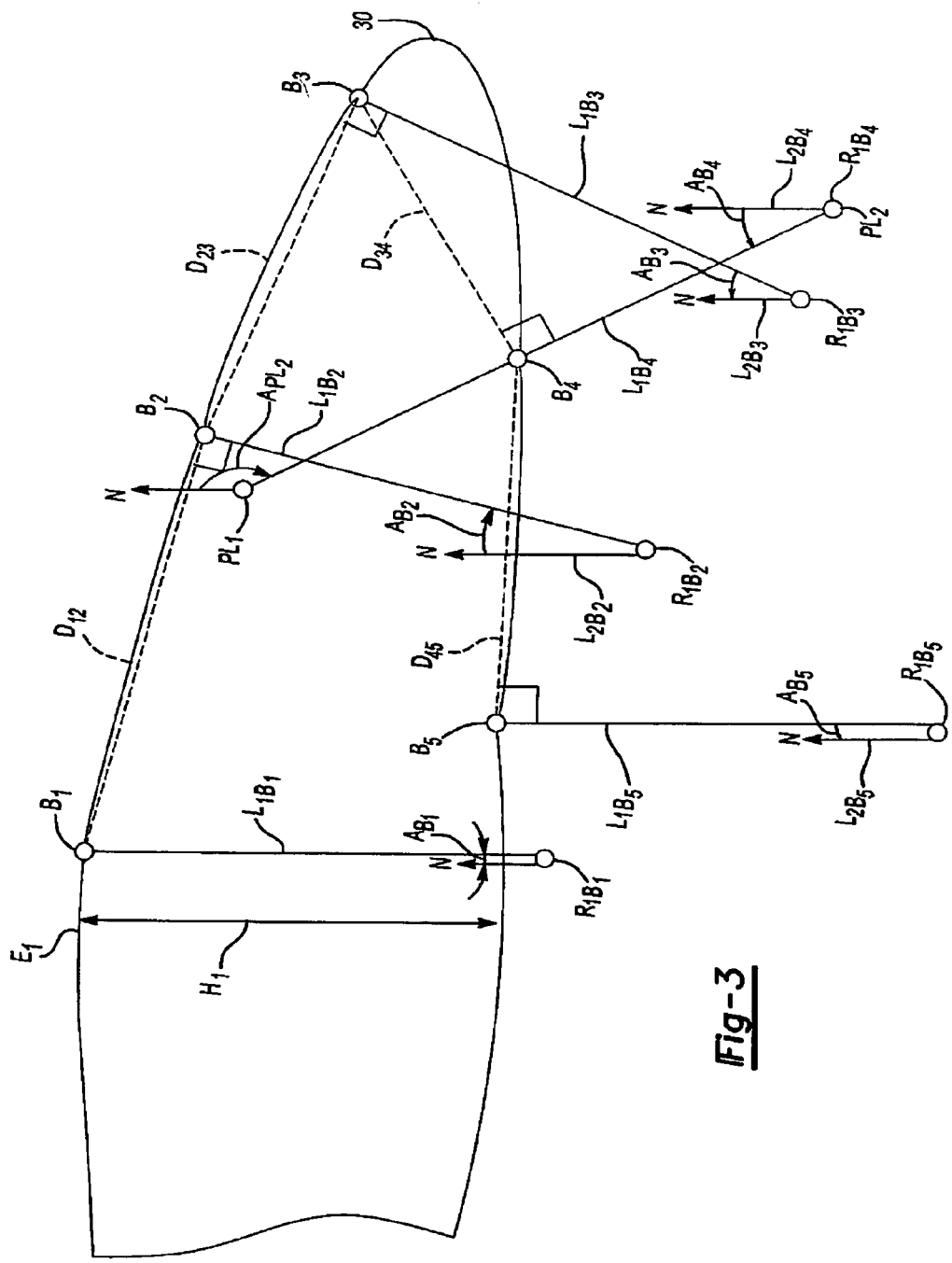
FIG. 3 is an example of determining whether the vehicle has rotated a desired amount based upon an expected curve and the compass tracking angles.

FIG. 3 illustrates an example of determining whether the vehicle has rotated a desired amount (using bin tracking for example) based upon an expected curve and the compass tracking angles. As described above, an expected curve is not necessarily calculated, but is shown to illustrate the expected shape of future collected data. In this example, the expected elliptical curve $E_1$ has a nominal height $H_1$ that is undesirable for the statistical fitting procedure of calibration (as described above). The processor module 16 tracks rotation of the vehicle 10 by determining compass tracking angles for magnetic field data points $B_1$–$B_5$ according to the method described above for FIG. 2. In the illustrated example each point $B_1$–$B_5$ is a greater distance than the threshold away from the corresponding previous point of reference $R_1$. The displacement lines D, first reference lines $L_1$, second reference lines $L_2$, selected reference points $R_1$ for each magnetic field data point $B_1$–$B_5$ are designated accordingly. For the magnetic field data point $B_4$, the processor module selected the $PL_2$ location rather than the $PL_1$ location because the $PL_2$ location is closer to the reference point $R_1B_3$ of the $B_3$ magnetic field data point (i.e. the previous reference point).

Selecting the $PL_2$ location effectively prevents the processor module 16 from tracking compass tracking angles in a portion of the angular ranges when the minor axis distance $H_1$ is smaller than the predetermined distance between a magnetic field data point and its corresponding point of reference $R_1$. In the illustrated example, the determined compass tracking angles $AB_1$, $AB_2$, $AB_3$, $AB_4$, and $AB_5$ are relatively close to north (e.g., under 30°). That is, even though the magnetic field data points $B_1$–$B_5$ turn around the end 30 of the expected elliptical curve $E_1$, the compass tracking angles do not follow (i.e., they do not exceed 90° in this example).

In the illustrated example, had the processor module 16 selected the $PL_1$ location for the point of reference $R_1B_4$ of the $B_4$ magnetic field data point, the compass tracking angle would have been $APL_2$. In the illustrated example, $APL_2$ is close to a south direction (i.e., greater than 90° and smaller than 270°), indicating that the compass tracking angle followed the $B_4$ magnetic field data point around the end 30 of the elliptical curve $E_1$. Since the processor module 16 selected the $PL_2$ location however, the angular range for $APL_2$ of the bin tracking procedure was not filled and the processor module 16 will not conclude that the vehicle 10 has rotated the desired amount. Thus, the size of the predetermined distance between a magnetic field data point and its corresponding point of reference $R_1$ and the 90° relationship of $R_1$ to the displacement line D controls the size of an expected ellipse E that can be used for calibration.

Figure 4:
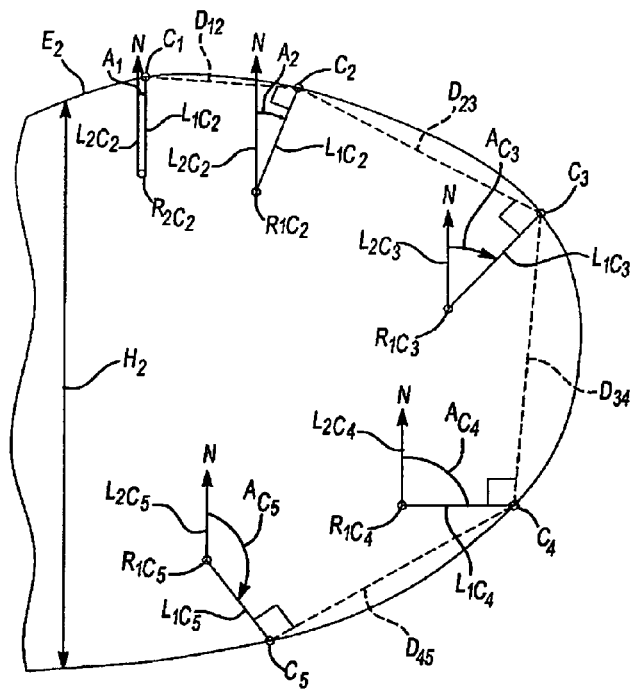
FIG. 4 is another example of determining whether the vehicle has rotated a desired amount based upon an expected curve and the compass tracking angles.

FIG. 4 illustrates another example of determining whether the vehicle has rotated a desired amount based upon the shape of an expected curve that the magnetic field data lies on and the compass tracking angles. In this example, an expected elliptical curve $E_2$ has a nominal height distance $H_2$ that is desirable for the statistical fitting procedure of calibration (i.e., larger than the predetermined distance). The processor module 16 tracks rotation of the vehicle 10 by determining compass tracking angles for magnetic field data points $C_1$–$C_5$ according to the method described above for FIG. 2 (in the illustrated example, each point $C_1$–$C_5$ is a greater distance than the threshold away from a previous point of reference $R_1$, e.g. $C_3$ is a greater distance than the threshold away from $R_1C_2$). The displacement lines D, first reference lines $L_1$, second reference lines $L_2$, selected reference points $R_1$ for each magnetic field data point $C_1$–$C_5$ are designated accordingly. Unlike the example of FIG. 3, the size of the predetermined distance between a magnetic field data point and its corresponding point of reference $R_1$ and the 90° relationship of $R_1$ to the displacement line does not prevent the processor module 16 from tracking a portion of the angular ranges because the minor axis distance $H_2$ is larger than the predetermined distance. Thus, adjusting the size of the predetermined distance allows one to control whether a particular set of magnetic field data are used for calibration based upon the shape of the expected ellipses E that the data lie on.

In the illustrated example, the compass tracking angles $AC_1$, $AC_2$, $AC_3$, $AC_4$, and $AC_5$ range from north to south (e.g., from close to 0° to close to 180°). That is, the magnetic field data points $C_1$–$C_5$ turn around the end 30 of the elliptical curve $E_1$ and the compass tracking angles follow (i.e., they exceed 90° in this example).

The disclosed example method provides the benefit of controlling which magnetic field data sets are used to perform calibrations based upon the predetermined distance of the points of reference from the magnetic field data point and the 90° relationship of the points of reference to the displacement line. This provides the benefit of a calibration that is more reliable than calibrations computed using previously known methods because desirable magnetic field data sets (i.e., those having desirable expected ellipses E) can be selected for calibration. Undesirable magnetic field data sets are not selected because the expected ellipses E are essentially not recognized as representing the desired rotation of the vehicle 10.

Figure 5:
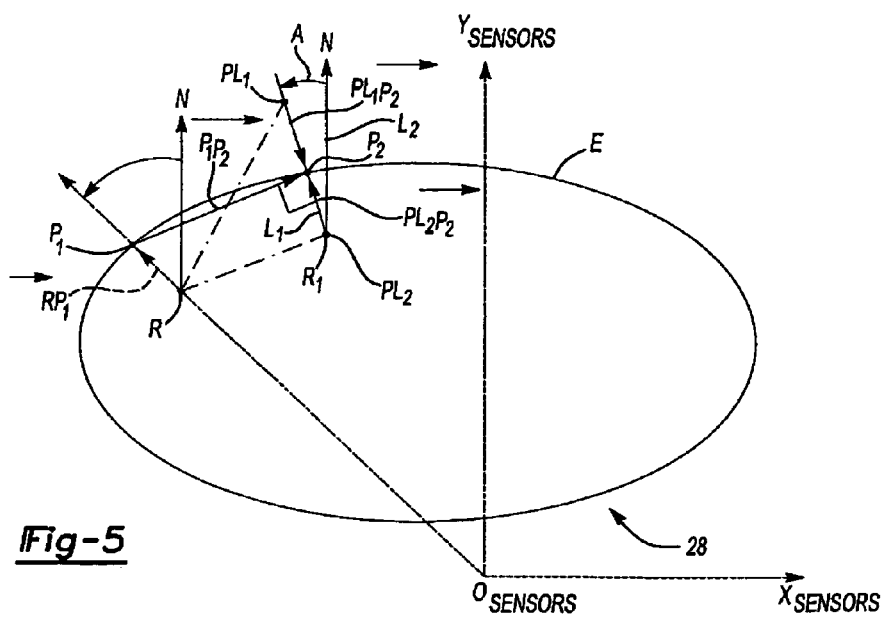
FIG. 5 is an example method of using vectorial orientation to determine the location of a point of reference from the two possible locations.

FIG. 5 illustrates an example method of using vectorial orientation to determine the location of the point of reference $R_1$ from the two possible locations, $PL_1$ and $PL_2$, instead of selecting the location that is closest distance to the point of reference R. In this example, a vector $\overrightarrow{RP_1}$ extends between the point of reference R and the magnetic field data point $P_1$. A second vector $\overrightarrow{P_1P_2}$ extends between the magnetic field data point $P_1$ and the magnetic field data point $P_2$. As is known, the orientation of $\overrightarrow{RP_1}$ relative to $\overrightarrow{P_1P_2}$ can be determined by calculating the determinant of these two vectors. The resultant determinant is either greater than zero or less than zero. In one example, a resultant determinant greater than zero is assigned a counterclockwise orientation and a resultant determinant less than zero is assigned a clockwise orientation. In this example, the resultant determinant of $\overrightarrow{RP_1}$ relative to $\overrightarrow{P_1P_2}$ is less than zero and is assigned a clockwise orientation.

A vector $\overrightarrow{PL_1P_2}$ extends between the first possible location $PL_1$ and the magnetic field data point $P_2$. A vector $\overrightarrow{PL_2P_2}$ extends between the second possible location $PL_2$ and the magnetic field data point $P_2$. In this example, the processor module 16 calculates the determinant of $\overrightarrow{PL_1P_2}$ relative to $\overrightarrow{P_1P_2}$ and the determinant of $\overrightarrow{PL_2P_2}$ relative to $\overrightarrow{P_1P_2}$. The resultant determinant of $\overrightarrow{PL_1P_2}$ relative to $\overrightarrow{P_1P_2}$ is either greater than or less than zero. If it is less than zero, then the resultant determinant of $\overrightarrow{PL_2P_2}$ relative to $\overrightarrow{P_1P_2}$ is greater than zero (and vice versa).

In one example, the resultant determinant of $\overrightarrow{PL_1P_2}$ relative to $\overrightarrow{P_1P_2}$ is greater than zero and is therefore assigned a counterclockwise orientation. The resultant determinant of $\overrightarrow{PL_2P_2}$ relative to $\overrightarrow{P_1P_2}$ is less than zero and is therefore assigned a clockwise orientation. The processor module 16 compares each of these orientations to the orientation calculated for $\overrightarrow{RP_1}$ relative to $\overrightarrow{P_1P_2}$ and selects the possible location, $PL_1$ or $PL_2$, that yields the same orientation as for or $\overrightarrow{RP_1}$ relative to $\overrightarrow{P_1P_2}$. In this example, $PL_2$ yielded a clockwise orientation so it is selected as the location for the point of reference $R_1$.

The disclosed example method provides the same benefits of locating the point of reference $R_1$ on the same side of the displacement line D as the point of reference R and controlling which expected elliptical curves E are used to perform calibrations based upon the predetermined distance of the points of reference from the magnetic field data point. The disclosed example may also provide more simplified calculations compared to the closest distance method.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of controlling an electronic compass assembly comprising:
   determining compass tracking angles in a coordinate system for magnetic field data points that correspond to magnetic field sensor signals produced as a vehicle rotates relative to a surrounding magnetic field, the magnetic field data points producing an expected curve in the coordinate system;
   tracking rotation of the vehicle relative to the surrounding magnetic field based upon the compass tracking angles; and
   determining whether the vehicle has rotated a desired amount based at least partially upon the expected curve and the compass tracking angles.

2. The method as recited in claim 1, including determining the compass tracking angles such that rotation of the vehicle through the desired amount is recognized when the expected curve includes a desirable mathematical feature and not recognized when the expected curve does not include the desirable mathematical feature.

3. The method as recited in claim 1, including determining a calibration curve based upon the magnetic field data points if the expected curve includes a desirable mathematical feature and if the vehicle has rotated a desired amount based upon the compass tracking angles.

4. The method as recited in claim 3, including determining whether the mathematical feature is desirable based upon a predetermined factor included in the determination of the compass tracking angles.

5. The method as recited in claim 4, including calculating a plurality of displacement lines that each extend between two magnetic field data points, calculating a plurality of first reference lines that each correspond to one of the displacement lines, each first reference line having a predetermined angular relationship to the corresponding displacement line and intersecting one of the two magnetic field data points.

6. The method as recited in claim 5, including calculating a plurality of second reference lines that each correspond to one of the first reference lines, each second reference line intersecting the corresponding first reference line and having a predetermined direction in the coordinate system, calculating an angle between each first reference line and the corresponding second reference line to produce one compass tracking angle.

7. The method as recited in claim 6, including storing each compass tracking angle within one of a plurality of angular ranges that each correspond to an increment of the desired amount of vehicle rotation and determining the calibration curve when each of the plurality of angular ranges includes a stored compass tracking angle.

8. The method as recited in claim 6, including storing each compass tracking angle within one of a plurality of angular ranges that each correspond to an increment of the desired amount of vehicle rotation, and determining that the vehicle has rotated the desired amount when each of the plurality of angular ranges includes a stored compass tracking angle.

9. The method as recited in claim 6, including establishing a point of reference along each of the plurality of first reference lines that is a predetermined distance from one magnetic field data point such that the point of reference has a desired orientation with respect to the displacement line that corresponds to the first reference line that the point of reference is on.

10. A method of controlling an electronic compass assembly comprising:
  establishing a first magnetic field data point and a second magnetic field data point in a coordinate system;
  determining a compass tracking angle that corresponds to one of the first magnetic field data point or the second magnetic field data point based upon a relationship of the first magnetic field data point to the second magnetic field data point; and
  selecting a location of a point of reference corresponding to the second magnetic field data point from a plurality of possible locations that are each a predetermined distance from the second magnetic field data point.

11. The method as recited in claim 10, including selecting the location of the point of reference based upon a line between the first magnetic field data point and the second magnetic field data point.

12. The method as recited in claim 11, including establishing an other point of reference that corresponds to the first magnetic field data point and that is the predetermined distance from the first magnetic field data point, and selecting the location of the point of reference from the plurality of locations based upon comparison of the distance between each of the plurality of locations and the other point of reference.

13. The method as recited in claim 10, including selecting the location of the point of reference based upon a vector between the first magnetic field data point and the second magnetic field data point.

14. The method as recited in claim 13, including establishing an other point of reference that corresponds to the first magnetic field data point and that is the predetermined distance from the first magnetic field data point, determining a second vector extending from the other point of reference to the first magnetic field data point, determining an orientation of the second vector relative to the vector between the first magnetic field data point and the second magnetic field data point, and establishing the point of reference based upon the orientation.

15. The method as recited in claim 14, including calculating the orientation of the second vector relative to the vector between the first magnetic field data point and the second magnetic field data point as being one of a clockwise orientation or a counterclockwise orientation, determining a third vector extending from the point of reference such that the orientation of the third vector relative to the vector between the first magnetic field data point and the second magnetic field data point is identical to the orientation of the second vector relative to the vector between the first magnetic field data point and the second magnetic field data point.

16. The method as recited in claim 15, including calculating a first determinant of the second vector relative to the vector between the first magnetic field data point and the second magnetic field data point and calculating a second determinant of the third vector relative to the vector between the first magnetic field data point and the second magnetic field data point, and comparing the first determinant to the second determinant to determine if the orientation of the third vector relative to the vector between the first magnetic field data point and the second magnetic field data point is identical to the orientation of the second vector relative to the vector between the first magnetic field data point and the second magnetic field data point.

17. An electronic compass assembly comprising:
  a processor module for controlling an electronic compass assembly, the processor module being operable to determine whether a vehicle has rotated a desired amount of vehicle rotation based at least partially upon compass tracking angles collected through rotation of the vehicle, the processor module being configured to:
  receive a first magnetic field data point and a second magnetic field data point for determining one of the compass tracking angles and calculate a displacement line that extends between them;
  calculate a first reference line having a predetermined angular relationship to the displacement line and intersecting the second magnetic field data point;
  establish a second reference line having a predetermined direction and intersecting the first reference line; and
  calculate an angle between the first reference line and the second reference line, the angle being one of the compass tracking angles.

18. The assembly as recited in claim 17, wherein the predetermined angular relationship is 90°.

19. The method as recited in claim 17, including storing the angle within one of a plurality of angular ranges that each correspond to an increment of the desired amount of vehicle rotation, and determining that the vehicle has rotated the desired amount of vehicle rotation when each of the plurality of angular ranges includes a stored angle.

20. The method as recited in claim 17, including establishing a point of reference along the first reference line such that the point of reference has a desired vectorial orientation with respect to a vector along the displacement line.

* * * * *